Patented Jan. 4, 1949

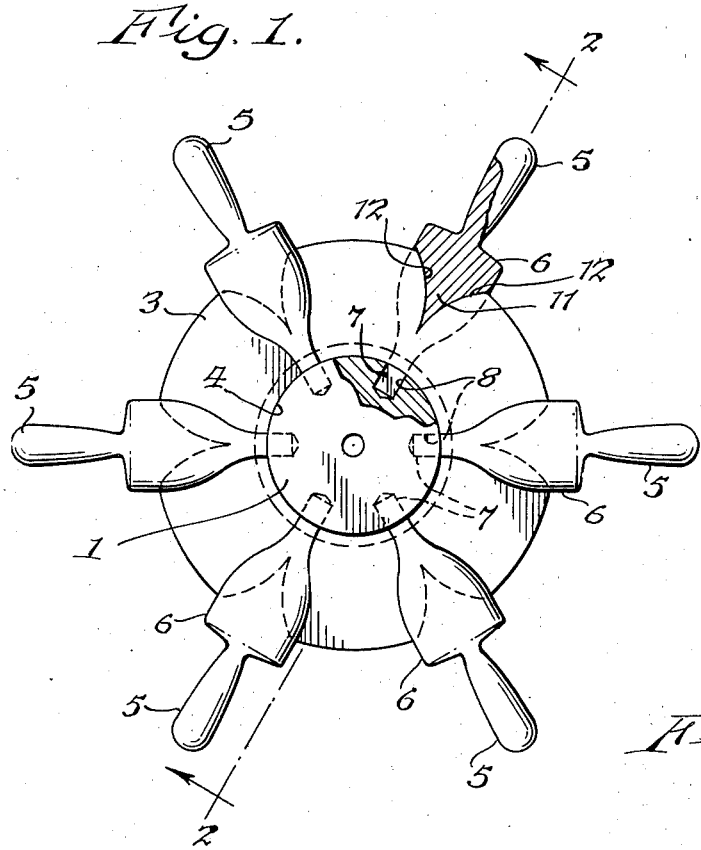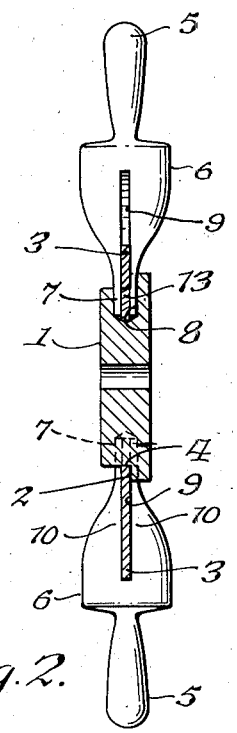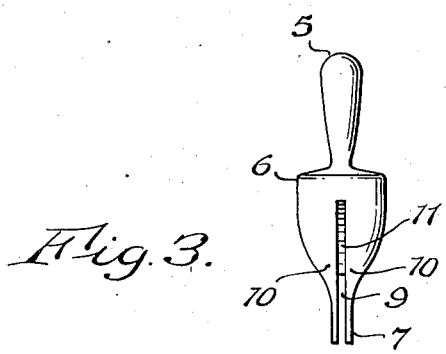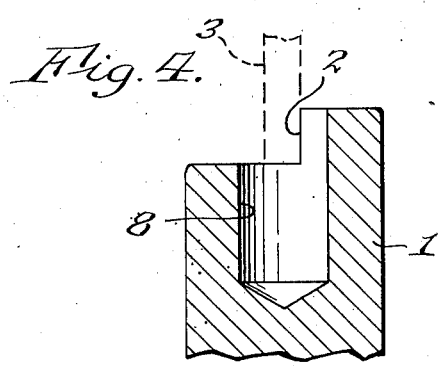

2,457,987

UNITED STATES PATENT OFFICE 2,457,987

HELM WHEEL

Joseph Egedi, Buffalo, N. Y.

Application April 7, 1947, Serial No. 739,874

3 Claims. (Cl. 114—160)

This invention relates to an improvement in helm wheels, that is to say wheels for the control of the helm apparatus of boats.

The principal objects of the invention are to provide a wheel which, by reason of novel features of construction and assembly, may be manufactured at greatly reduced cost, certain wood bending and other special operations necessary in wheels of standard construction being wholly eliminated; and at the same time to provide a wheel which will have the additional advantages of combining substantially increased strength with desirable lightness of weight and attractiveness of appearance.

An embodiment of the invention is illustrated in the accompanying drawing in which:

Figure 1 is an elevation of the wheel with parts shown in section.

Figure 2 is a section on the line 2—2 of Figure 1, looking in the direction of the arrows.

Figure 3 is an elevation of a combined spoke and handle.

Figure 4 is a detail section of a portion of the hub.

The wheel includes a hub 1 having a central opening by means of which it may be mounted upon the shaft (not shown) of the helm apparatus. A plate 3 having a central opening 4 is fitted closely upon the perimetric surface of the hub, the plate being substantially co-planar with the central plane of the hub. The hub is shown as of circular outline and is preferably formed peripherally with a recess 2, preferably of rabbeted cross section. The wall of the opening 4 has close fit upon the base of the recess 2 and the portion of the plate 3 contiguous to the opening 4 abuts the annular shoulder provided by the vertical wall of said recess. In assembling the parts of the wheel the portion of the plate 3 contiguous to the opening 4 may be secured as by any suitable cement to the adjacent walls of the recess 2. The plate 3 may be of any suitable material, e. g. ply wood, stainless steel, glass or plastic. For small launches or other power driven boats transparent plastic material is quite satisfactory, being light in weight, non-frangible and attractive in appearance.

The radially extending handles 5 by which the wheel is turned are provided at the outer ends of radially extending spoke elements 6 which, at their inner ends, terminate in axial extensions 7 that fit closely in radially extending sockets 8 in the hub 1, the sockets being open to the peripheral face of the recess 2 and also open to the peripheral face of the hub behind the vertical wall of the recess 2. With the plate 3 in abutting engagement with the vertical wall of the recess 2 the sockets are located symmetrically of the central plane of the plate.

The spokes 6 are formed in a central longtudinal plane with recesses 9. In the lateral dimension the recesses 9 are of diametric extent and in the longitudinal dimension they extend from points suitably inward of the handles 5 to the inner ends of the spokes, that is to say through the projections 7. By virtue of the recesses 9 the spokes are of fork-like form and have side portions 10 which provide the side walls of the recesses 9. The plate 3, which has a radial extent such that it constitutes the "body" of the wheel and which is preferably formed as a disc, projects into the recesses 9 with a close fit, the side walls of these recesses as provided by the side portions 10 of the spokes being contiguous to the flat surfaces of the plate. The recesses 9 are so formed as to provide radially extending webs 11 of V-shape in longitudinal section and which project inward from the parts of the spoke which are of continuous cross section, the dimensions of the webs being such that they reinforce the spokes in connection with the provision of the recesses 9. The plate 3 is formed along its perimetric surface with radially extending V-shaped recesses 12 conforming in outline and dimensions to the webs 11. These fit closely and conformably in the recesses 12 and thereby the spokes are positively coupled to the plate as a result of which in the manipulation of the wheel the stresses developed by pushing or pulling pressure applied to the handles 5 will be taken up by the plate and not by the reduced inner terminal projections 7 of the spokes, the dimensions of the webs 11 and recesses 12 being amply sufficient for this purpose.

Within the sockets 8 filler pieces 13 may be arranged to close the recesses 9 inward of the opening 4 of the plate. The projections 7 may be secured in any suitable manner in the sockets 8, for example as by water-proof cement or doweling. The side portions 10 of the forks provided by the recesses 9 and the webs 11 of the spokes are preferably secured by suitable cement to the adjoining faces of the plate 3 and the walls of the recesses 12. The spokes 6 by virtue of the recesses 9 positively clamp the plate 3 upon the hub, preventing relative lateral displacement of these parts, and by virtue of the webs 11 positively hold the plate against peripheral displacement upon the hub.

I claim:

1. A helm wheel comprising a hub, a plate constituting the body of the wheel and having a central opening by means of which it is fitted closely upon the perimetric surface of the hub, the plate being substantially co-planar with the central plane of the hub and the hub being provided with radially extending sockets open to its perimetric surface, and radially extending spoke elements provided at their outer ends with handles and at their inner ends with axial extensions secured in the sockets with a close fit, the spoke elements being each provided in a central longitudinal plane with a recess which in the lateral dimension is of diametric extent and in the longitudinal dimension extends from a point suitably inward of the handle to and through the extension, the plate having a close fit in the recesses of the spoke elements, the spoke elements have side portions which provide the side walls of the recesses and the recesses being so formed as to provide webs which project radially inward from the parts of the spoke elements which are of continuous cross section, the plate having recesses open to its perimetric face and which conform in dimensions and outline to the webs and the webs having a close fit within the recesses of the plate, the sockets being substantially symmetrical to the central plane of the plate as fitted upon the hub.

2. A helm wheel as set forth in claim 1 wherein the hub has a perimetric recess of rabbeted cross section and the plate has a close fit upon the base of the recess and abuts its vertical wall.

3. A helm wheel as set forth in claim 1 wherein the hub is of circular outline and has a peripheral recess of rabbeted cross section, the plate is in the form of a disc having a central opening by means of which it has a close fit upon the base of the recess and is located in abutting relation with the vertical wall of the recess and the webs are of V-shaped outline in the central longitudinal planes of the spokes.

JOSEPH EGEDI.

No references cited.